(12) United States Patent
Morimoto

(10) Patent No.: US 6,169,562 B1
(45) Date of Patent: Jan. 2, 2001

(54) IMAGE EXPOSURE APPARATUS

(75) Inventor: Yoshinori Morimoto, Kanagawa (JP)

(73) Assignee: Fuji Photo Film Co., Ltd., Kanagawa (JP)

( * ) Notice: Under 35 U.S.C. 154(b), the term of this patent shall be extended for 0 days.

(21) Appl. No.: 09/145,963

(22) Filed: Sep. 3, 1998

(30) Foreign Application Priority Data

Sep. 3, 1997 (JP) .................................................. 9-238222

(51) Int. Cl.$^7$ ...................................................... B41J 2/435

(52) U.S. Cl. ......................... 347/232; 347/233; 347/116; 372/23; 372/20

(58) Field of Search ..................................... 347/115, 116, 347/130, 132, 233, 237, 232, 238, 247; 250/370.01, 370.08, 494.1; 372/23, 20; 359/17, 204

(56) References Cited

U.S. PATENT DOCUMENTS 5,162,929 * 11/1992 Roddy et al. ......................... 359/17
5,296,958 * 3/1994 Roddy et al. ........................ 359/204

FOREIGN PATENT DOCUMENTS 9-11538    1/1997   (JP) .

* cited by examiner

Primary Examiner—N. Le
Assistant Examiner—Hai C. Pham

(57) ABSTRACT

An image exposure apparatus which can prevent occurrence of color displacement at a low cost is structured to comprise at least three kinds of light sources each of which emits a light of a different wavelength, deflecting device which deflects at least three kinds of emitted light emitted by the light sources in a predetermined scanning direction, a scanning lens which is disposed so that the at least three kinds of emitted light deflected by the deflecting device can be transmitted therethrough and which allows each chromatic aberration of two kinds of emitted light from among the at least three kinds of emitted light to have substantially the same characteristics, clock generating device for generating a scanning clock for the two kinds of emitted light and a scanning clock for emitted light other than the two kinds of emitted light, each frequency of the scanning clocks being determined in advance so that the two kinds of emitted light and the emitted light other than the two kinds of emitted light have substantially the same scanning lengths on an exposure surface, and modulating device which modulates the two kinds of emitted light based on image data and the scanning clock for the two kinds of emitted light, and also modulates the emitted light other than the two kinds of emitted light based on image data and the scanning clock for the emitted light other than the two kinds of emitted light.

13 Claims, 12 Drawing Sheets

IMAGE EXPOSURE APPARATUS

BACKGROUND OF THE INVENTION

1. Field of the Invention

The present invention relates to an image exposure apparatus, and particularly to an image exposure apparatus in which, based on image data, at least three types of emitted light having different wavelengths are irradiated onto a photosensitive material, thereby forming a latent image on the photosensitive material.

2. Description of the Related Art

In recent years, an image exposure apparatus, which effects scan and exposure of a photographic printing paper by using a light source which emits laser light, has been used widely for writing an image in a digital laboratory system or the like, in which an image recorded on a photographic film is recorded on a photographic printing paper (i.e., a photosensitive material).

Such a conventional image exposure apparatus includes light sources which emit laser light of colors red (R), green (G), and blue (B), respectively. Laser light is modulated for each of the colors R, G, and B based on color image data and deflected by a deflector such as a polygon mirror in a main scanning direction, and simultaneously, the photographic printing paper is conveyed in a sub-scanning direction. The laser light is further transmitted through an fθ lens to allow an image to be scanned and exposed onto the photographic printing paper, and a color image is thus recorded on the photographic printing paper.

The conventional image exposure apparat us thus causes laser light emitted from the light sources to be transmitted through the fθ lens, and therefore, there exists a drawback in that the laser lights of each of the colors have different scanning lengths on an exposure surface, due to chromatic aberration of the fθ lens, thereby causing displacement of color. The chromatic aberration mentioned herein refers to the fact that, since the refractive index of a glass (a lens) varies so as to correspond to the magnitude of a wavelength of light, the position and size of an image formed by a ray of light other than a paraxial ray change due to the wavelength of light.

In order to solve the above-described drawback, for example, Japanese Patent Application Laid-Open (JP-A) No. 9-11538 discloses that improvement in image quality is achieved in such a manner that the respective scanning lengths of the laser lights of the colors a re made to coincide with one another by adjusting the time interval (cycle) at which pixels are written for each laser light, and the write starting position set by each laser light is made to coincide.

Further, as a conventional art in addition to the above, there exists a method for manufacturing and using a lens (achromatic lens) for correcting chromatic aberration of the laser light of all three colors of R, G, and B.

However, in the above-described publication (JP-A No. 9-11538), the time interval at which the pixels are written is adjusted for each laser light, and therefore, a circuit having a complicated structure, such as a phase locked loop circuit formed by an integrator, a phase comparator, a voltage-controlled oscillator, and the like is necessary, thereby resulting in an increase in the cost of the entire apparatus.

In the method for manufacturing and using an achromatic lens for correcting chromatic aberration of laser light of all three colors of R, G, and B, a great deal of adjustment and a large number of processes are required when the achromatic lens is manufactured, thereby resulting in the cost of the entire apparatus increasing in the same manner as described above. Further, conventionally, the main scanning wavelength is approximately 210 mm, and when the main scanning wavelength is made longer (for example, 254 mm), laser light passes through the peripheral portion, having a large aberration, of an fθ lens. In this case, it is difficult to optically correct the color aberration.

SUMMARY OF THE INVENTION

The present invention has been devised to solve the above-described drawbacks, and an object thereof is to provide an image exposure apparatus which can prevent the occurrence of color displacement at a low cost.

In order to achieve the above-described object, there is provided an image exposure apparatus according to a first aspect, which comprises at least three kinds of light sources each of which emits a light of a different wavelength, deflecting device which deflects at least three kinds of emitted light emitted by the light sources in a predetermined scanning direction, a scanning lens which is disposed so that the at least three kinds of emitted light deflected by the deflecting device can be transmitted therethrough and which allows each chromatic aberration of two kinds of emitted light from among the at least three kinds of emitted light to have substantially the same characteristics, clock generating device for generating a scanning clock for the two kinds of emitted light and a scanning clock for emitted light other than the two kinds of emitted light, each frequency of the scanning clocks being determined in advance so that the two kinds of emitted light and the emitted light other than the two kinds of emitted light have substantially the same scanning lengths on an exposure surface, and modulating device which modulates the two kinds of emitted light based on image data and the scanning clock for the two kinds of emitted light, and also modulates the emitted light other than the two kinds of emitted light based on image data and the scanning clock for the emitted light other than the two kinds of emitted light.

According to the first aspect of the present invention, at least three kinds of light sources emit light of different wavelengths and the three or more kinds of emitted light are deflected by the deflecting device in a predetermined scanning direction. As a result, main scanning of the three or more kinds of emitted light is effected. Subsequently, the three or more kinds of emitted light deflected by the deflecting device are transmitted through the scanning lens in which each chromatic aberration of the two kinds of emitted light from among the three or more kinds of emitted light has substantially the same characteristic, and arrives at an exposure surface of a photosensitive material such as a photographic printing paper, thereby allowing scan and exposure of laser light. At this time, the above-described two kinds of emitted light are modulated by the modulating device based on image data and the scanning clock for the above-described two kinds of emitted light, and the emitted light other than the two kinds of emitted light is modulated based on image data and the scanning clock for the emitted light other than the two kinds of emitted light.

The scanning clock for the above-described two kinds of emitted light and the scanning clock for the emitted light other than the two kinds of emitted light, which are used for the scan and exposure, are generated by the clock generating device in such a manner that the frequency of each of these scanning clocks is determined so that the two kinds of emitted light and the emitted light other than the two kinds of emitted light have substantially the same scanning lengths on the exposure surface.

As described above, according to the image exposure apparatus of the first aspect of the present invention, the scanning lens in which each chromatic aberration of the two kinds of emitted light is of the substantially same characteristic is used to allow the two kinds of emitted light to have substantially the same scanning lengths on the exposure surface, and the frequency of each of the scanning clock for the two kinds of emitted light and the scanning clock for the emitted light other than the two kinds of emitted light is determined so that the two kinds of emitted light and the emitted light other than the two kinds of emitted light have substantially the same scanning lengths on the exposure surface, thereby resulting in the respective scanning lengths of all emitted light being made substantially coincident with one another in a simple manner. Accordingly, as compared with a case in which the time interval at which pixels are written for each laser light is adjusted and a case in which an achromatic lens for correcting chromatic aberration of all three laser lights of R, G, and B is manufactured and used, occurrence of color displacement can be prevented at a low cost.

According to a second aspect of the present invention, there is provided an image exposure apparatus in which modulating device is any one of an acousto-optic modulation element, an electro-optic modulation element, and a magneto-optic modulation element.

Further, in the image exposure apparatus according to the first aspect or the second aspect of the present invention, the two kinds of emitted light are preferably emitted light whose wavelengths are the most distant from each other from among the three or more kinds of emitted light. As described above, by selecting the two kinds of emitted light having substantially the same characteristic of chromatic aberration in the scanning lens, the scanning lens can be manufactured easily.

DESCRIPTION OF THE PREFERRED EMBODIMENTS

Referring now to the attached drawings, an embodiment in a case in which an image exposure apparatus of the present invention is applied to a digital laboratory system will be hereinafter described in detail. First, a description will be given of a digital laboratory system according to the embodiment of the present invention.

Overview of an Entire System

Figure 1:
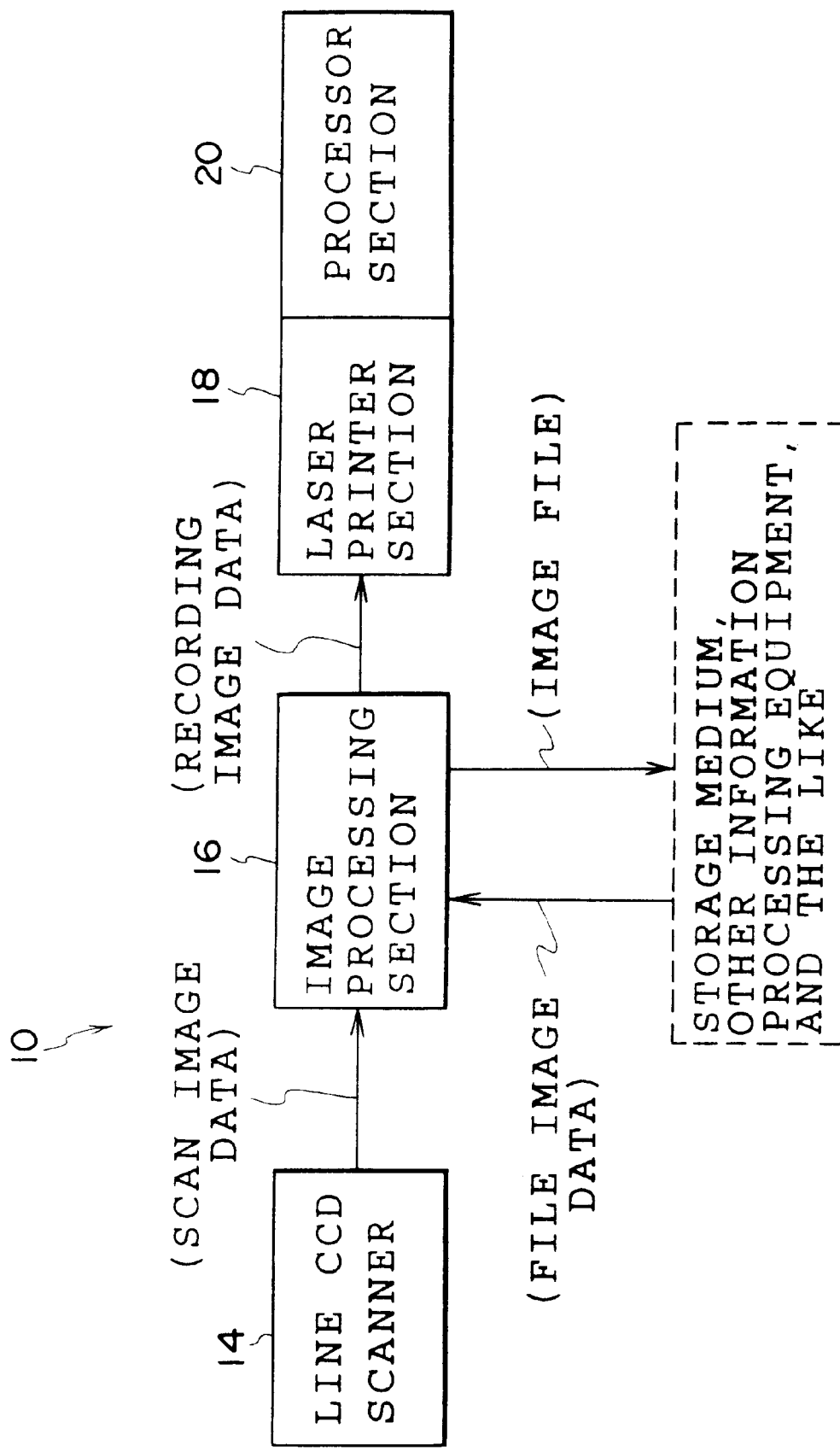
FIG. 1 is a schematic block diagram of a digital laboratory system according to an embodiment of the present invention.
Figure 2:
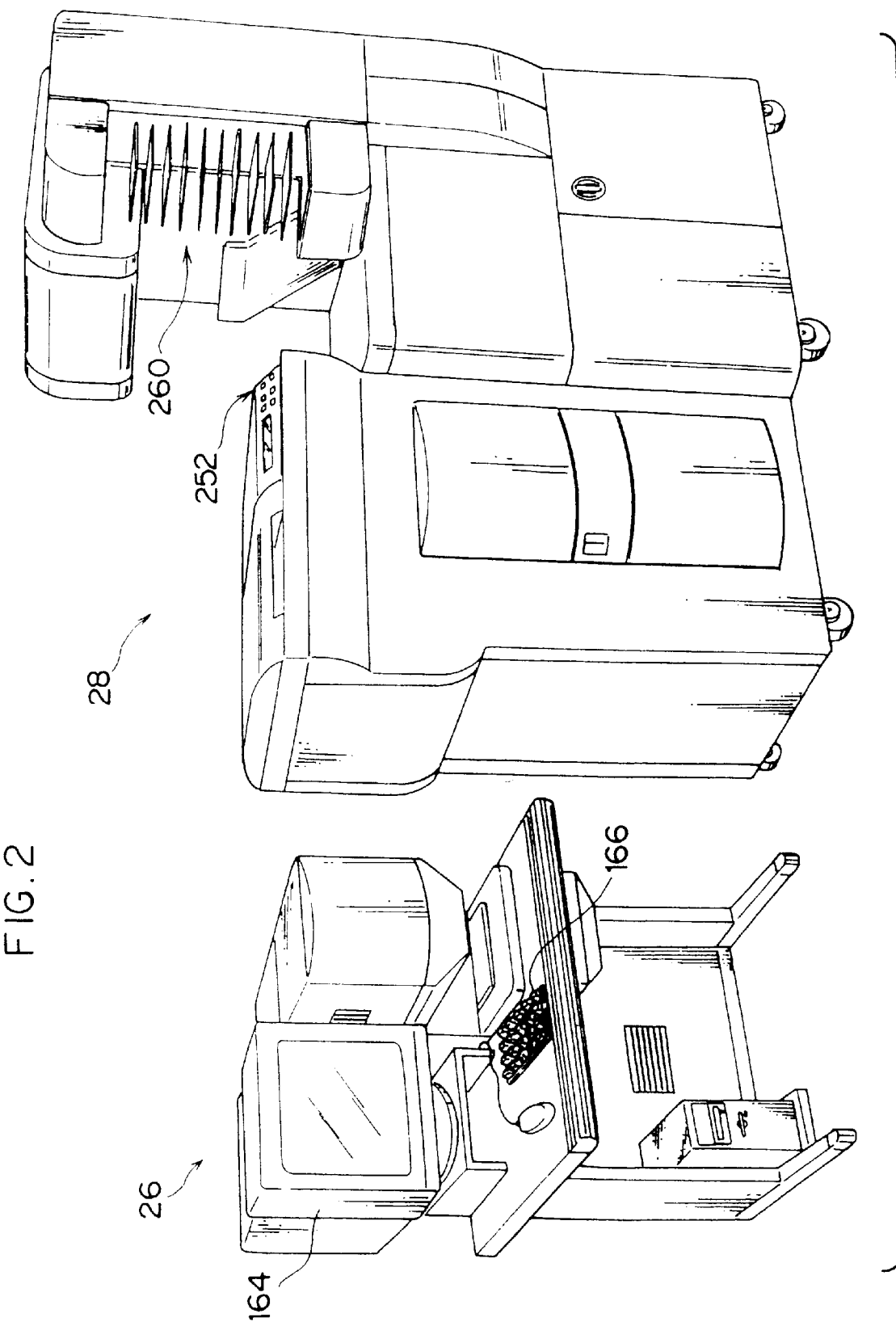
FIG. 2 is an outside view of the digital laboratory system.

FIG. 1 shows a schematic structure of a digital laboratory system 10 according to the embodiment of the present invention. FIG. 2 shows the exterior appearance of the digital laboratory system 10. As shown in FIG. 1, the laboratory system 10 is structured to include a line CCD scanner 14, an image processing section 16, a laser printer section 18, and a processor section 20. The line CCD scanner 14 and the image processing section 16 are provided in an input section 26 shown in FIG. 2 and the laser printer section 18 and the processor section 20 are provided in an output section 28 shown in FIG. 2.

The line CCD scanner 14 is used to read a film image recorded on a photographic film such as a negative film and a reversal film. Examples of the photographic film on which a film image to be read is recorded include a photographic film in 135 magazines, a photographic film in 110 magazines, and a photographic film with a transparent magnetic layer formed thereon (i.e., a photographic film in 240 magazines: a so-called APS film), and photographic films in 120 magazines and 220 magazines (Brownie size). The line CCD scanner 14 reads the film image to be read, as described above, by a line CCD and outputs image data. An area CCD scanner for reading a film image by an area CCD may be provided in place of the line CCD scanner 14.

The image processing section 16 is structured to allow input of image data outputted from the line CCD scanner 14 (i.e., scan image data) and also allow input of image data obtained by photographing using a digital camera, image data obtained by reading an original other than the film image (for example, an reflection original) by a scanner, image data generated by a computer, and the like (which will be generically referred to as file image data) from the outside (for example, input of image data via a storage medium such as a memory card or input of image data from the other information processing equipment via a communication line).

The image processing section 16 effects image processing including various corrections and the like for the input image data and outputs the image data, as recording image data, to the laser printer section 18. Further, the image processing section 16 also can output the image data subjected to the image processing, as an image file, to the outside (for example, the image data can be outputted to a storage medium such as a memory card or transferred to the other information processing equipment via a communication line).

The laser printer section 18 includes laser light sources which emit laser light of R, G, and B and causes laser light modulated to correspond to the recording image data inputted from the image processing section 16 to be irradiated on a photographic printing paper so as to record an image on the photographic printing paper by scan exposure processing. Further, the processor section 20 effects various processes including color development, bleach-fix, washing, and drying for the photographic printing paper on which an image is recorded by scan exposure processing in the laser printer section 18. As a result, an image is formed on the photographic printing paper.

Structure of Line CCD Scanner

Figure 3:
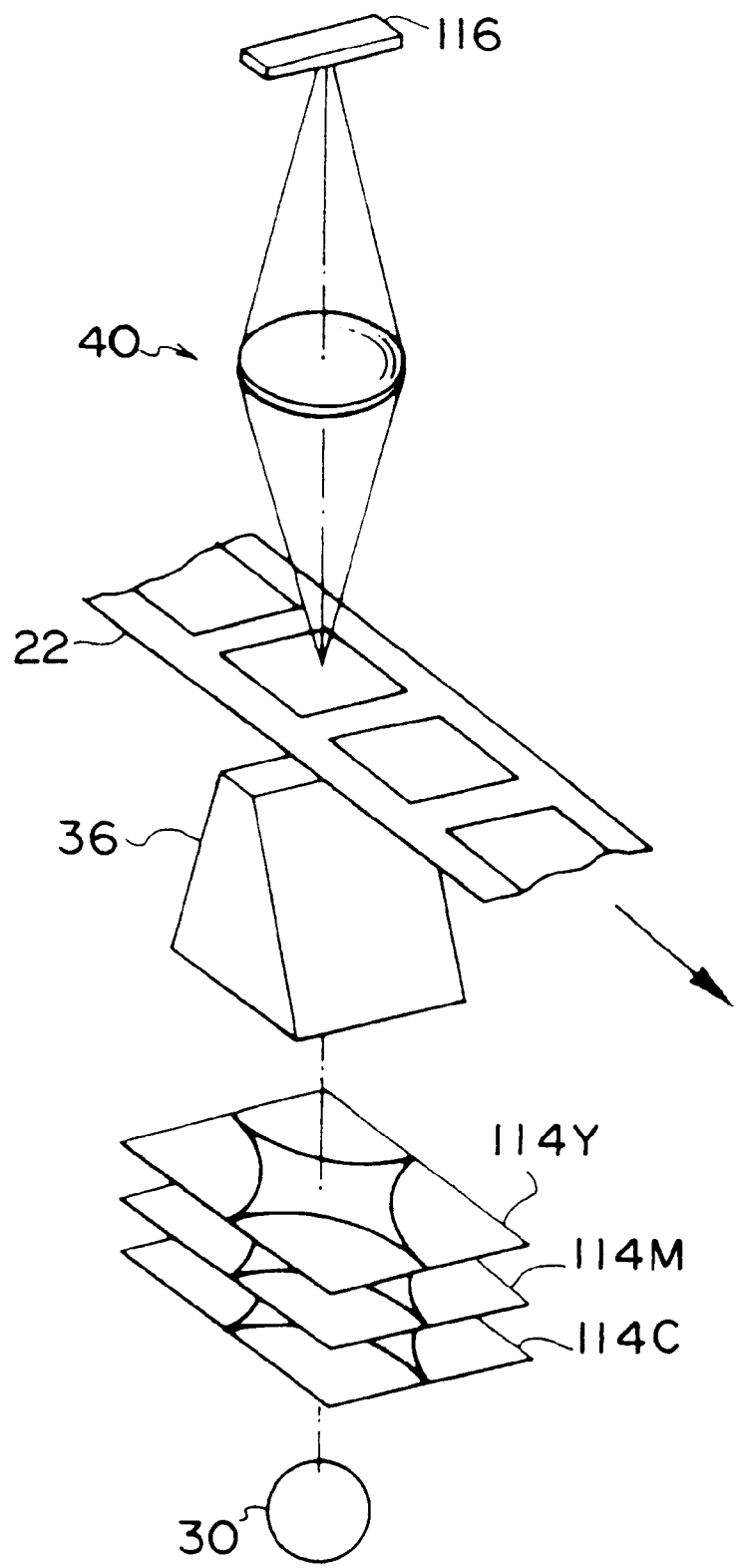
FIG. 3 is a schematic structural diagram of an optical system of a line CCD scanner.

Next, a description will be given of the structure of the line CCD scanner 14. FIG. 3 shows a schematic structure of an optical system of the line CCD scanner 14. This optical system includes a light source 30 comprised of a halogen lamp or a metal halide lamp and applying light to the photographic film 22. A light diffusion box 36 by which light to be irradiated on the photographic film 22 is made into diffused light is disposed at a light emission side of the light source 30.

The photographic film 22 is conveyed by a film carrier 38 (shown in FIG. 5, but not shown in FIG. 3), which is disposed at a light emission side of the light diffusion box 36, in a direction perpendicular to an optical axis. In FIG. 3, there is shown an elongated photographic film 22. However, an exclusively-used film carrier is provided for a slide film held by a holder for a slide for each frame (i.e., a reversal film), or an APS film (a film carrier exclusively used for the APS film has a magnetic head for reading magnetic record data magnetically recorded on a magnetic layer of the film), and these photographic films can also be conveyed.

Light adjusting filters 114C, 114M, and 114Y of cyan (C), magenta (M), and yellow (Y) are disposed between the light source 30 and the light diffusion box 36 sequentially along the optical axis of emitted light. A lens unit 40 which allows imaging of light transmitted through the film image and a line CCD 116 are disposed, sequentially along the optical axis, at the side of the photographic film 22 opposite to the side at which the light source 30 is disposed. Although in FIG. 3 a single lens is merely shown as the lens unit 40, the lens unit 40 is actually a zoom lens formed from a plurality of lenses.

The line CCD 116 is structured in such a manner that a sensing portion, in which photoelectric conversion elements formed from CCD cells are disposed in one row and an electronic shutter mechanism is disposed, is provided in each of three lines which are parallel to each other at intervals and color separation filters of R, G, and B are respectively mounted on the light-incidence sides of the sensing portions (i.e., the line CCD 116 is a so-called three-line color CCD). The line CCD 116 is disposed in such a manner that a light receiving surface of each sensing portion coincides with the position of an imaging point of the lens unit 40. Further, a transfer portion is provided in the vicinity of each sensing portion so as to correspond to the sensing portion. The charge accumulated in each of the CCD cells of each sensing portion is sequentially transferred via a corresponding transfer portion. Although not illustrated, a shutter is provided between the line CCD 116 and the lens unit 40.

Figure 4:
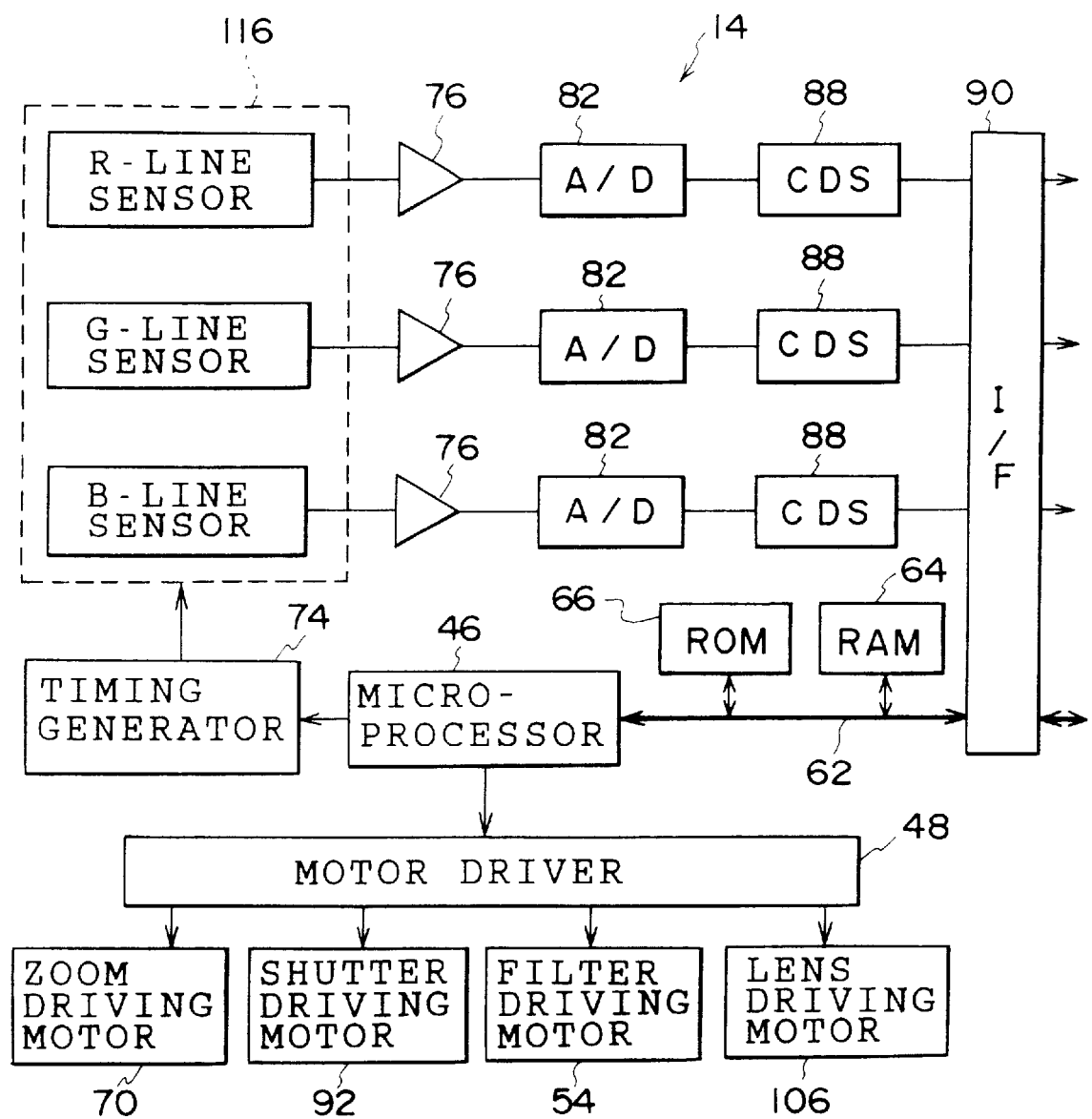
FIG. 4 is a block diagram which schematically shows the structure of an electric system of the line CCD scanner.

FIG. 4 shows a schematic structure of an electric system of the line CCD scanner 14. The line CCD scanner 14 includes a microprocessor 46 which effects control of the entire line CCD scanner 14. RAM 64 (for example, SRAM), ROM 66 (for example, ROM which can rewrite the stored content) are connected via a bus 62 to the microprocessor 46, and a motor driver 48 is also connected to the microprocessor 46. A filter driving motor 54 is connected to the motor driver 48. The filter driving motor 54 allows the light adjusting filters 114C, 114M, and 114Y to slide-move independently.

The microprocessor 46 allows the light source 30 to be turned on and off accompanied with an on-off operation of a power source switch (not shown). Further, during reading of a film image by the line CCD 116 (i.e., photometric processing), the microprocessor 46 causes the filter driving motor 54 to slide-move the light adjusting filters 114C, 114M, and 114Y independently, so as to adjust an amount of light made incident on the line CCD 116 for each of light of component colors.

Also connected to the motor driver 48 are a zoom driving motor 70 and a lens driving motor 106. The zoom driving motor 70 varies a zoom magnification of the lens unit 40 by relatively moving the positions of the plurality of lenses of the lens unit 40. The lens driving motor 106 moves the position of an imaging point of the lens unit 40 by moving the entire lens unit 40. The microprocessor 46 varies the zoom magnification of the lens unit 40 by the zoom driving motor 70 to a desired magnification in accordance with a size of a film image or with or without trimming made.

A timing generator 74 is connected to the line CCD 116. The timing generator 74 generates various timing signals (clock signals) for operating the line CCD 116, A/D converters 82, which will be described later, and the like. Signal output ends of the line CCD 116 are connected to the A/D converters 82 via amplifiers 76 and the signals outputted from the line CCD 116 are amplified by the amplifiers 76 and are converted to digital data in the A/D converters 82.

The output ends of the A/D converters 82 are each connected to an interface (I/F) circuit 90 via a correlated double sampling circuit (CDS) 88. The CDS 88 effects sampling of feed-through data which indicates the level of a feed-through signal and pixel data which indicates the level of a pixel signal and subtracts the feed-through data from the pixel data for each pixel. The calculated results (pixel data which respectively correspond correctly to the amounts of charge accumulated in the CCD cells) are sequentially outputted, as scan image data, to the image processing section 16 via the I/F circuit 90.

Meanwhile, photometric signals of R, G, and B are outputted concurrently from the line CCD 116, and therefore, three signal processing systems each including the amplifiers 76, the A/D converters 82, and CDSs 88 are provided and image data of R, G, and B are concurrently outputted, as scan image data, from the I/F circuit 90.

Further, a shutter driving motor 92 which opens and closes the shutter is connected to the motor driver 48. The dark output level of the line CCD 116 is corrected in an image processing section 16 at a subsequent stage, and when reading of the film image is not effected, the dark output level can be obtained by the microprocessor 46 closing the shutter.

Structure of Image Processing Section

Figure 5:
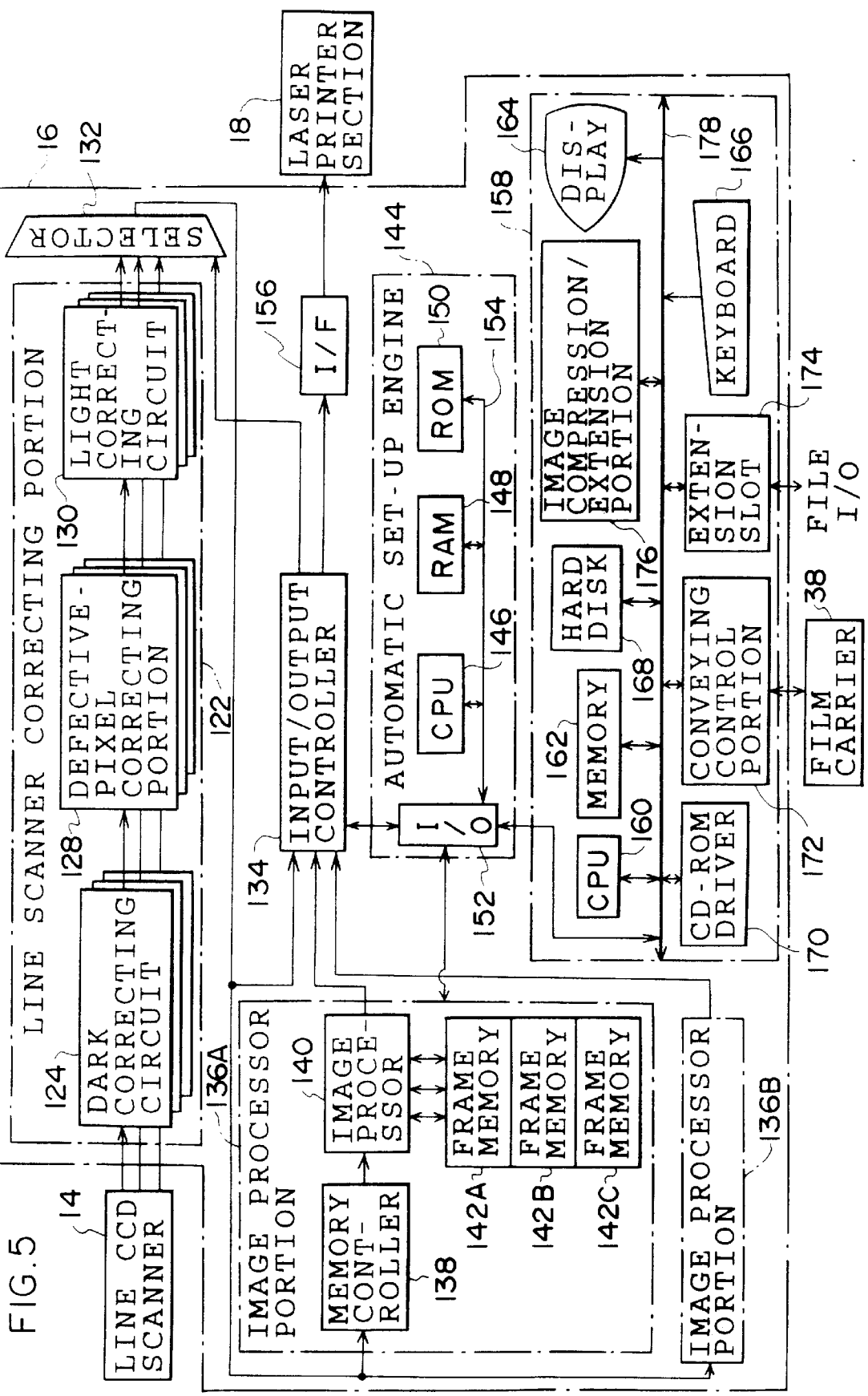
FIG. 5 is a block diagram which schematically shows the structure of an image processing section.

Next, a description will be given of the structure of the image processing section 16 with reference to FIG. 5. The image processing section 16 has a line scanner correcting portion 122 corresponding to the line CCD scanner 14. The line scanner correcting portion 122 includes three signal processing systems each having a dark correcting circuit 124, a defective-pixel correcting portion 128, and a light correcting circuit 130, correspondingly to image data of R, G, and B concurrently outputted from the line CCD scanner 14.

The dark correcting circuit 124 effects correction by storing, for each of cells, data inputted from the line CCD scanner 14 (i.e., data which represents a dark output level of each of cells of the sensing portion of the line CCD 116) in the state in which the light made incident on the line CCD 116 is cut off by the shutter and by subtracting the dark output level of a cell corresponding to each pixel from scan image data inputted from the line CCD scanner 14.

Further, the photoelectric conversion characteristic of the line CCD 116 varies for each of the cells. In the light correcting circuit 130 after the defective-pixel correcting portion 128, with an adjusting film image whose entire image surface has a constant density being set on the line CCD scanner 14, a gain is set for each of the cells based on image data of the adjusting film image inputted from the line CCD scanner 14 after the adjusting film image has been read by the line CCD 116 (the variation in density between pixels represented by the image data results from variations of the photoelectric conversion characteristics of the cells), and image data of a film image to be read inputted from the line CCD scanner 14 is corrected for each pixel in accordance with the gain set for each of the cells.

On the other hand, when the density of a specified pixel in the image data of the adjusting film image is greatly different from that of other pixels, there is some abnormality about the cell of the line CCD 116 corresponding to the specified pixel and it can be determined that the specified pixel is defective. The defective-pixel correcting portion 128 stores an address of the defective pixel based on the image data of the adjusting film image. Among the image data of the film image to be read which is inputted from the line CCD scanner 14, data of the defective pixel is interpolated by data of peripheral pixels to allow generation of new data.

Further, the line CCD 116 is formed in three lines (rows of CCD cells) extending in a direction perpendicular to the conveying direction of the photographic film 22 and disposed in the conveying direction of the photographic film 22 at predetermined intervals, and therefore, there is the difference in time at which output of image data of each of component colors of R, G, and B from the line CCD scanner 14 starts between these component colors. The line scanner correcting portion 122 is provided with a delay circuit (not shown) and the delay circuit delays the output timing of image data at a different delay time for every remaining two colors, with an output timing of image data outputted slowest of all as a reference, so that respective image data of R, G, and B of the same pixel on the film image are outputted simultaneously.

Output ends of the line scanner correcting portion 122 are connected to input ends of a selector 132 and image data outputted from the correcting portion 122 is inputted to the selector 132. The input end of the selector 132 is also connected to a data output end of an input/output controller 134 and external-input film image data is inputted from the input/output controller 134 to the selector 132. An output end of the selector 132 is connected to each data input end of the input/output controller 134 and image processor portions 136A and 136B. The selector 132 allows the inputted image data to be selectively outputted to each of the input/output controller 134 and the image processor portions 136A and 136B.

The image processor portion 136A includes a memory controller 138, an image processor 140, and three frame memories 142A, 142B, and 142C. The frame memories 142A, 142B, and 142C each have a capacity which allows storage of image data of a film image of one frame. The image data inputted from the selector 132 is stored in any one of the three frame memories and the memory controller 138 controls an address when the image data is stored in the frame memory 142 so that the inputted image data respectively corresponding to pixels are stored in a storage region of the frame memory 142 in such a state as to be arranged in a fixed order.

The image processor 140 fetches image data stored in the frame memory 142 and effects various image processing including gradation conversion, color conversion, hypertone processing which compresses gradation of extra-low frequency luminance components of an image, hypersharpness processing which highlights sharpness while suppressing granularity, and the like. Meanwhile, the processing condition of the above-described image processing is automatically calculated by an automatic set-up engine 144 (which will be described later) and the image processing is effected in accordance with the calculated processing condition. The image processor 140 is connected to the input/output controller 134, and after the image data subjected to the image processing is temporarily stored in the frame memory 142, the image data is outputted to the input/output controller 134 at a predetermined timing. The image processor portion 136B has the same structure as that of the above-described image processor portion 136A, and a description thereof will be omitted.

In the present embodiment, two reading operations of different resolutions are effected for each film image in the line CCD scanner 14. In the case of the first reading operation at a relatively low resolution (which will be referred to as "pre-scan"), even when the density of a film image is extremely low (for example, even when an overexposed negative image on a negative film is used), reading of the film image is effected under a reading condition which is determined so as to prevent occurrence of saturation of accumulated charge in the line CCD 116 (the amount of light irradiated on the photographic film for each wavelength of light of the colors R, G, and B, and the time of charge accumulated in the CCD). The data obtained by the pre-scan (i.e., pre-scan image data) is inputted from the selector 132 to the input/output controller 134 and is also outputted to the automatic set-up engine 144 connected to the input/output controller 134.

The automatic set-up engine 144 includes CPU 146, RAM 148 (for example, DRAM), ROM 150 (for example, ROM which can rewrite the stored content), and an input/output port 152, which are connected together via a bus 154.

The automatic set-up engine 144 determines, based on pre-scan image data of film images of a plurality of frames inputted from the input/output controller 134, an amount of light of the light source 30 in the second reading operation by the line CCD scanner 14 at a relatively high resolution (which will be hereinafter referred to as "fine scan"), calculates a processing condition of the image processing for image data obtained by fine scan, and outputs the calculated processing condition to the image processor 140 of the image processor portion 136. In the calculation of the processing condition of the image processing, it is determined from an exposure amount during photographing, a type of a light source for photographing, and other characteristic amount, whether a plurality of film images with similar scenes photographed exists. When the plurality of film images with similar scenes photographed exists, the processing condition of image processing for fine-scan image data of these film images is determined so as to become identical or approximate.

Meanwhile, an optimum processing condition of image processing varies depending on whether image data after image processing is used for recording of an image on a photographic printing paper in the laser printer section 18 or is outputted externally. The image processing section 16 includes two image processor portions 136A, 136Bh, and therefore, for example, when image data is used for recording of an image on a photographic printing paper and is also outputted externally, the automatic set-up engine 144 calculates a processing condition most suitable for each of various purposes and outputs the calculated processing condition to the image processor portions 136A, 136B. As a result, in the image processor portions 136A, 136B, image processing is effected for the same fine-scan image data under different processing conditions.

Moreover, the automatic set-up engine 144 calculates, based on pre-scan image data of the film image inputted from the input/output controller 134, an image-recording parameter which defines gray balance when an image is recorded on a photographic printing paper in the laser printer section 18, and outputs the calculated parameter simultaneously with outputting of recording image data (described later) to the laser printer section 18. Further, the automatic set-up engine 144 calculates a processing condition for image processing for file image data inputted from the outside in the same way as the aforementioned.

The input/output controller 134 is connected via an I/F circuit 156 to the laser printer section 18. When the image data after image processing is used for recording of an image on a photographic printing paper, the image data subjected to image processing in the image processor portion 136 is outputted, as recording image data, from the input/output controller 134 to the laser printer section 18 via the I/F circuit 156. Further, the automatic set-up engine 144 is connected to a personal computer 158. When the image data subjected to image processing is outputted externally as an image file, the image data subjected to image processing in the image processor portion 136 is outputted from the input/output controller 134 to the personal computer 158 via the automatic set-up engine 144.

The personal computer 158 includes a CPU 160, a memory 162, a display 164, a keyboard 166 (also seen in FIG. 2), a hard disk 168, a CD-ROM driver 170, a conveying control portion 172, an extension slot 174, and an image compression/extension portion 176. These components are connected together via a bus 178. The conveying control portion 172 is connected to the film carrier 38 and controls conveying of the photographic film 22 effected by the film carrier 38. Further, when an APS film is set in the film carrier 38, information (for example, a size of an image recorded, or the like) read from the magnetic layer of the APS film by the film carrier 38 is inputted.

A driver (not shown) which effects data reading/writing for a storage medium such as a memory card, or a communication control device which communicates with other information processing equipment is connected via the extension slot 174 to the personal computer 158. When image data to be outputted externally is inputted from the input/output controller 134, the image data is outputted, as an image file, to the outside (for example, to the above-described driver or communication control device) via the extension slot 174. Further, when file image data is inputted from the outside via the extension slot 174, the inputted file image data is outputted to the input/output controller 134 via the automatic set-up engine 144. In this case, the input/output controller 134 outputs the inputted file image data to the selector 132.

Meanwhile, when the pre-scan image data or the like is outputted to the personal computer 158, a film image read by the line CCD scanner 14 is shown on the display 164 or an image obtained by being recorded on the photographic printing paper is estimated and shown on the display 164, and an instruction for correction of the image, or the like is given by an operator via the keyboard 166, the image processing section 16 also allows the correction of an image to be reflected in the processing condition for image processing.

Structures of Laser Printer Section and Processor Section

Figure 6:
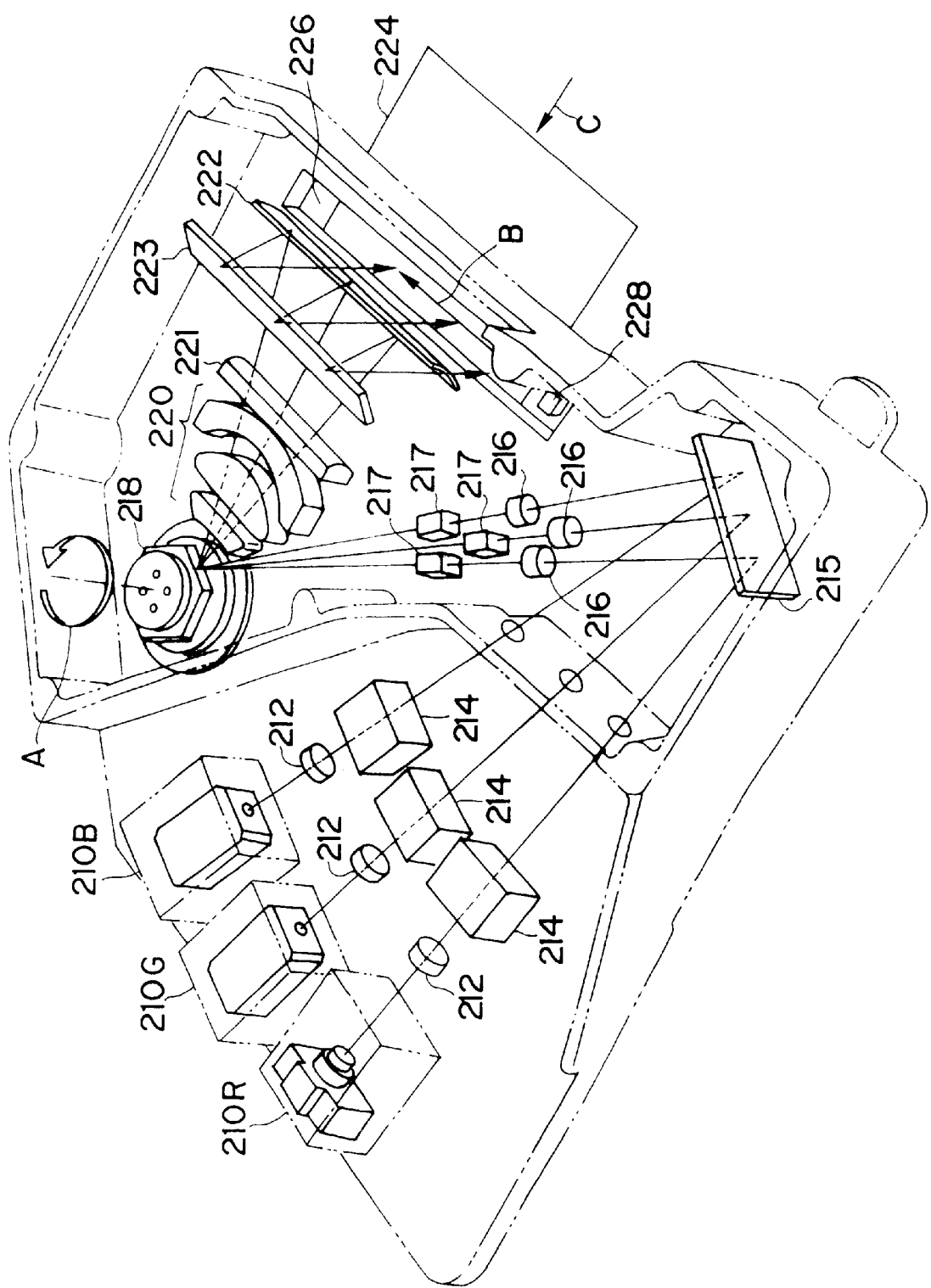
FIG. 6 is a schematic structural diagram of an optical system of a laser printer section.

Next, a description will be given of the laser printer section 18 and the processor section 20. FIG. 6 shows the structure of an optical system of the laser printer section 18. The laser printer section 18 includes, as the light source of the present invention, three laser light sources 210R, 210G, and 210B. The laser light source 210R is formed from a semiconductor laser (LD) which emits laser light (R-laser light) having a wavelength of R (for example, 685 nm). The laser light source 210G is formed from an LD and a wavelength conversion element (SHG) which converts laser light emitted from the LD to laser light whose wavelength is a half thereof and an oscillation wavelength of the LD is determined so that laser light (G-laser light) having a wavelength of G (for example, 532 nm) is emitted from the SHG. Similarly, the laser light source 210B is also formed from the LD and SHG and the oscillation wavelength of the LD is determined so that laser light (B-laser light) having a wavelength of B (for example, 473 nm) is emitted from the SHG. Meanwhile, a solid-state laser may be used in place of the above-described LD.

A collimator lens 212 and an acoustooptic light modulation element (AOM) 214 serving as modulation means are sequentially disposed at a laser light exit side of each laser light source 210R, 210G, and 210B. Each AOM 214 is disposed so as to allow each incident laser light to be transmitted through an acoustooptic medium and is also connected to an AOM driver 213 (see FIG. 8). When a high-frequency signal is inputted from the AOM driver 213, an ultrasonic wave corresponding to the high-frequency signal is propagated through the acoustooptic medium and an acoustooptic effect acts on laser light transmitted through the acoustooptic medium to cause diffraction. As a result, laser light having an intensity corresponding to the amplitude of the high-frequency signal is emitted, as diffracted light, from each AOM 214.

A plane mirror 215 is disposed at the side where diffracted light is emitted from each AOM 214. A spherical lens 216, a cylindrical lens 217, and a polygon mirror 218 serving as deflecting means are sequentially disposed at each of the sides where respective laser lights are emitted from the plane mirror 215. R-laser light, G-laser light, and B-laser light each emitted, as diffracted light, from each AOM 214 are reflected by the plane mirror 215, and thereafter, these laser lights are irradiated onto substantially the same position on the reflecting surface of the polygon mirror 218 via the spherical lenses 216 and the cylindrical lenses 217 and are reflected by the polygon mirror 218.

An fθ lens 220 serving as a scanning lens, and a cylindrical lens 221 and a cylindrical mirror 222 each having power in a sub-scanning direction to correct inclination are sequentially disposed at a laser-light exit side of the polygon mirror 218, and a return mirror 223 is disposed at a laser-light exit side of the cylindrical mirror 222.

Three laser light reflected by the polygon mirror 218 is sequentially transmitted through the fθ lens 220 and the cylindrical lens 221 and reflected by the cylindrical mirror 222. Thereafter, the reflected laser light is reflected by the return mirror 223 in a substantially vertically downward direction and irradiated onto the photographic printing paper 224 via an open hole portion 226. These laser lights may also be reflected by the cylindrical mirror 222 directly in a substantially vertically downward direction and irradiated onto the photographic printing paper 224 without using the return mirror 223.

The fθ lens 220 is designed so as to be formed by three groups three lenses so that the characteristic of chromatic aberration in R-laser light and the characteristic of chromatic aberration in B-laser light become the substantially same. With R-laser light and B-laser light being transmitted through the fθ lens 220, the scanning wavelength of the R-laser light on the photographic printing paper 224 and the scanning wavelength of the B-laser light on the photographic printing paper 224 can be substantially the same. Namely, the fθ lens 220 is formed as an achromatic lens which is substantially achromatized for the R-laser light and the B-laser light.

Figure 7:
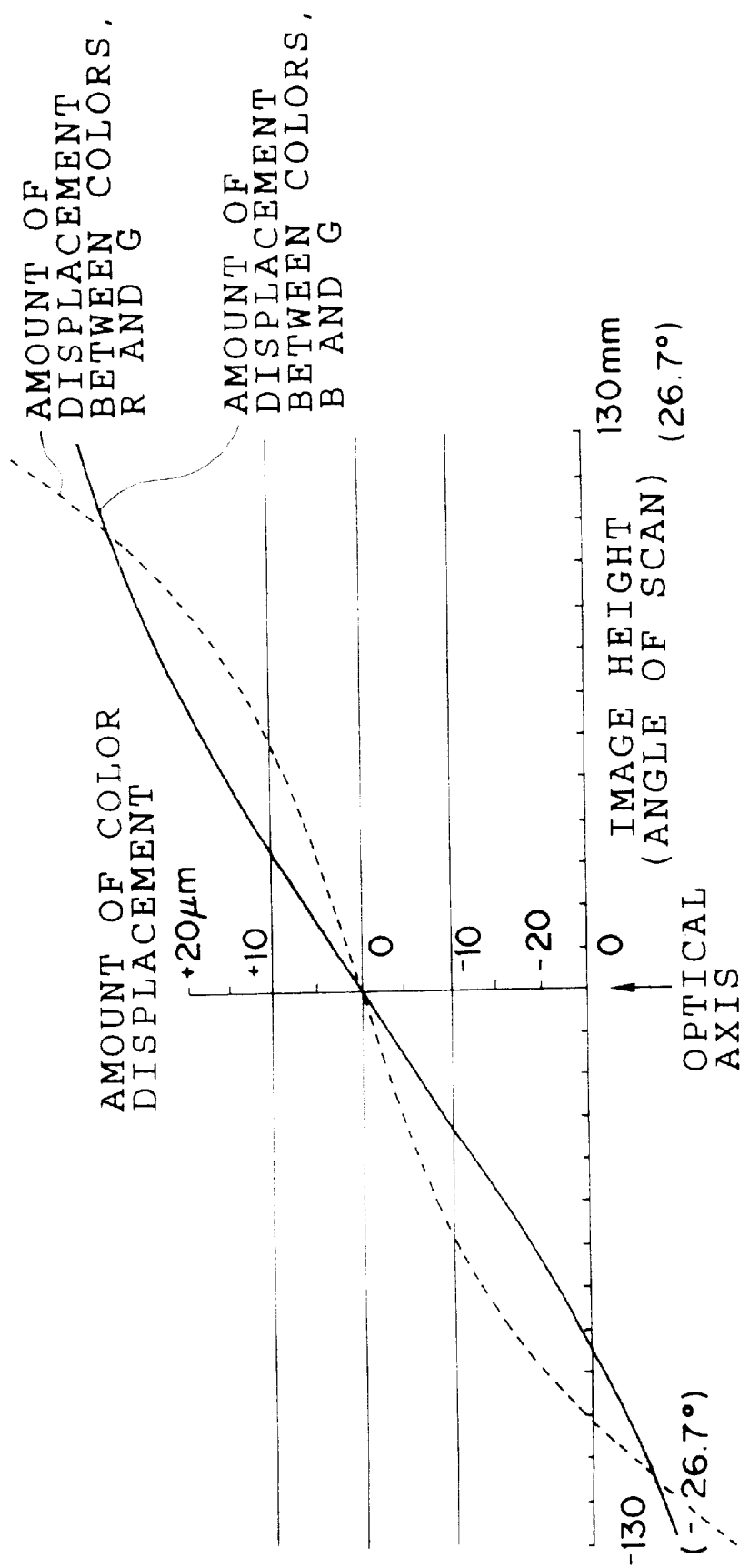
FIG. 7 is a graph which shows amounts of color displacement between R-laser light and G-laser light and between B-laser light and G-laser light when the frequency of a scanning clock is common to these laser light.

When the fθ lens 220 thus designed is used so that the scanning clock of each laser light has the same frequency, and scan and exposure is effected so that the central positions of the images formed on the photographic printing paper 224 by each laser light are coincident with one another, the amount of color displacement between R-laser light and G-laser light and the amount of color displacement between B-laser light and G-laser light both gradually increase together with the distance from the optical axis to the right side on the paper of FIG. 7, and also, gradually decrease with the distance from the optical axis to the left side on the paper of FIG. 7. Namely, the absolute value of each of the above-described amounts of color displacement becomes larger with the distance from the optical axis.

On the other hand, a start of scan detecting sensor (which will be hereinafter referred to as an SOS detecting sensor) 228 for detecting R-laser light which has arrived there at through the open hole portion 226 is disposed by the side of or near a scan/exposure start position on the photographic printing paper 224. Meanwhile, R-laser light is used as the laser light to be detected by the SOS detecting sensor 228 for the following reasons: photographic printing paper has a low sensitivity to R-laser light so the amount of R-laser light is thereby set at the maximum, and therefore, R-laser light can reliably be detected; when scanning is effected by rotating the polygon mirror 218, the R-laser light arrives first at the SOS detecting sensor 228; and the like. Further, in this embodiment, a signal outputted from the SOS detecting sensor 228 (which will be hereinafter referred to as a sensor output signal) usually is set at a low level, and only when R-laser light is detected, is the signal set at a high level.

Figure 8:
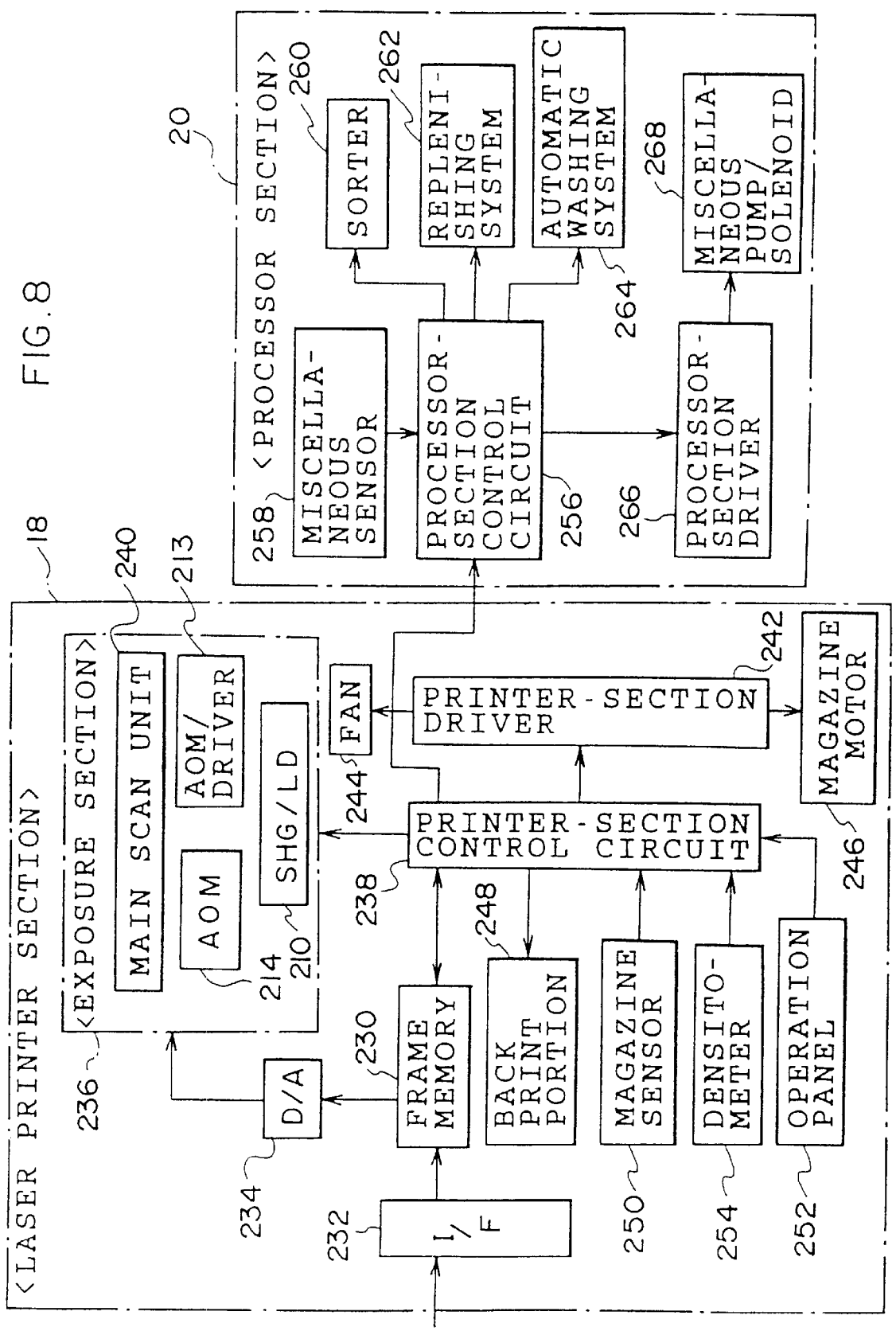
FIG. 8 is a block diagram which schematically shows the structure of each electric system of the laser printer section and a processor section.

FIG. 8 schematically shows the structures of electric systems of the laser printer section 18 and the processor section 20. The laser printer section 18 includes a frame memory 230 which stores image data. The frame memory 230 is connected via an I/F circuit 232 to the image processing section 16 and recording image data inputted from the image processing section 16 (i.e., image data which represent densities of R, G, and B for each of pixels of an image to be recorded on the photographic printing paper 224) are temporarily stored in the frame memory 230 via the I/F circuit 232. The frame memory 230 is connected via an D/A converter 234 to an exposure section 236 and is also connected to a printer-section control circuit 238.

The exposure section 236 includes, as described above, three laser light sources 210 each formed from the LD (and the SHG) and three systems each including AOM 214 and AOM driver 213, and also includes the polygon mirror 218 and a main-scan unit 240 having a motor for rotating the polygon mirror 218. The exposure section 236 is connected to the printer-section control circuit 238 and the operation of each portion thereof is controlled by the printer-section control circuit 238.

Figure 9:
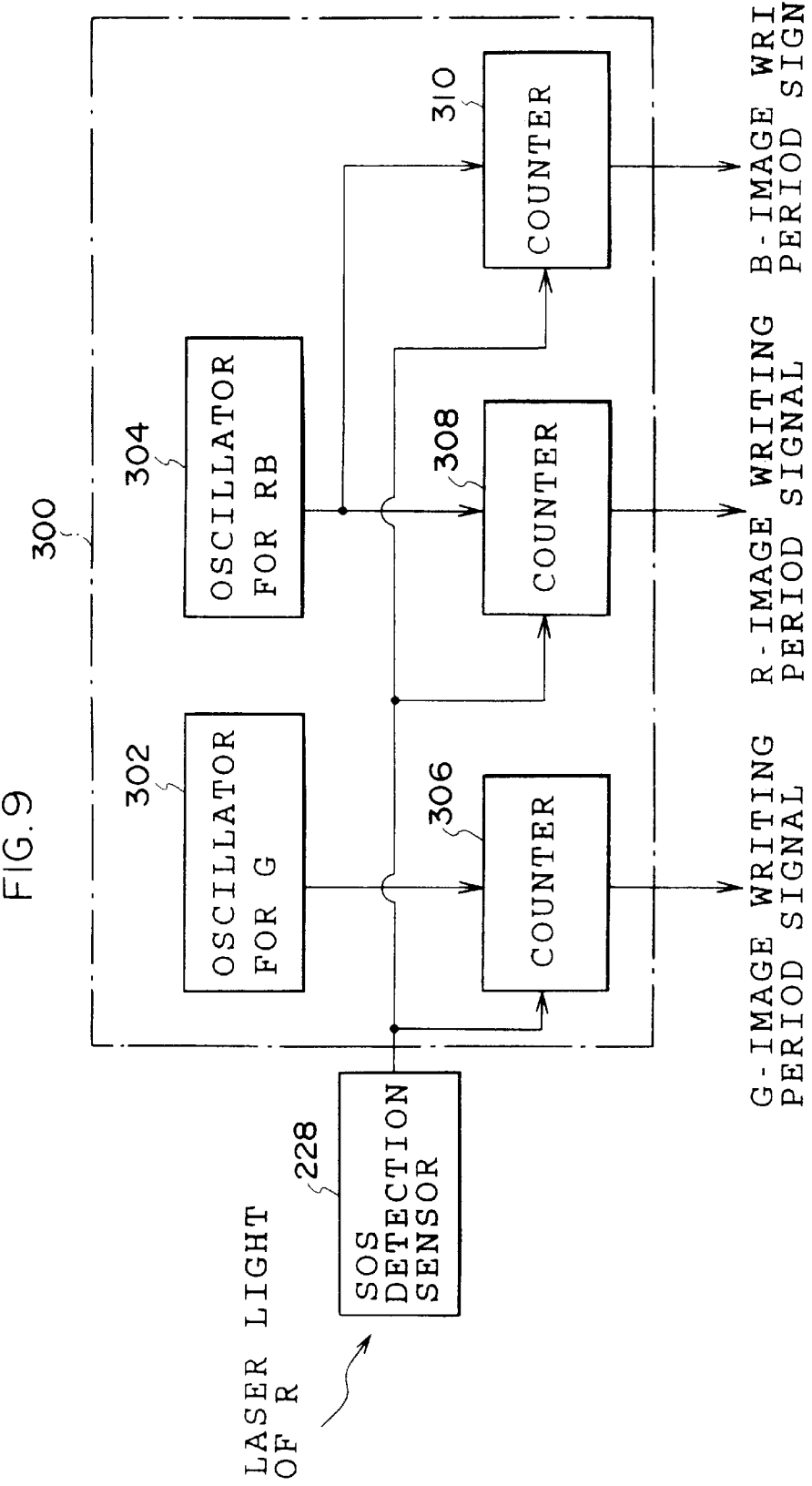
FIG. 9 is a block diagram which schematically shows the structure of an exposure timing generator in a printer section control circuit.

The printer section control circuit 238 includes an exposure timing generating portion 300 (see FIG. 9) for generating a signal which indicates the timing of scan and exposure on the photographic printing paper 224. The exposure timing generating portion 300 is provided with a G-oscillator 302 for generating a scanning clock of G-laser light (which will be hereinafter referred to as a G-scanning clock) and an RB-oscillator 304 for generating a common scanning clock of R-laser light and B-laser light (which will be hereinafter referred to as an RB-scanning clock).

An output end of the clock signal of the G-oscillator 302 is connected to a counter 306 to which the SOS detecting sensor 228 is connected, and an output end of the clock signal of the RB-oscillator 304 is connected to a counter 308 and a counter 310, to both of which the SOS detecting sensor 228 is also connected. The counter 306 generates a signal, based on a signal from the SOS detecting sensor 228 and a scanning clock from the G-oscillator 302, which indicates an image writing period by G-laser light (which will be hereinafter referred to as a G-image writing period signal). Further, the counters 308 and 310 both generate a signal, based on a signal from the SOS detecting sensor 228 and a scanning clock from the RB-oscillator 304, which indicates an image writing period by R-laser light (which will be hereinafter referred to as an R-image writing period signal) and which indicates an image writing period by B-laser light (which will be hereinafter referred to as a B-image writing period signal), respectively.

The frequency $f_{RB}$ of a scanning clock generated by the RB-oscillator 304 is determined by the following expression (1) with the frequency $f_G$ (for example, 12 MHz) of a scanning clock generated by the G-oscillator 302 as a reference.

$$f_{RB} = f_G/0.99973 \qquad (1)$$

The expression (1) is a formula derived in such a manner as described below.

Namely, the absolute values of the amount of color displacement between R-laser light and G-laser light and the amount of color displacement between B-laser light and G-laser light, when each laser light of R, G, and B is used to scan and expose on the photographic printing paper 224 at a scanning clock of the same frequency both increase gradually as the distance from the optical axis increases. This is caused by the difference between the scanning lengths of R-laser light and B-laser light on the photographic printing paper 224, and the scanning wavelength of G-laser light on the photographic printing paper 224 at the same scanning angle due to the chromatic aberration of the fθ lens. Accordingly, when each laser beam has substantially the same scanning wavelength, such color displacement can be prevented. Therefore, in order for each laser beam to have substantially the same scanning wavelength, the frequency $f_{RB}$ of the scanning clock of R-laser light and B-laser light needs to be set with the frequency $f_G$ of the scanning clock of G-laser light as a reference. Meanwhile, the fθ lens is substantially achromatized for R-laser light and B-laser light, and therefore, the R-laser light and B-laser light each have substantially the same scanning wavelength.

Figure 10:
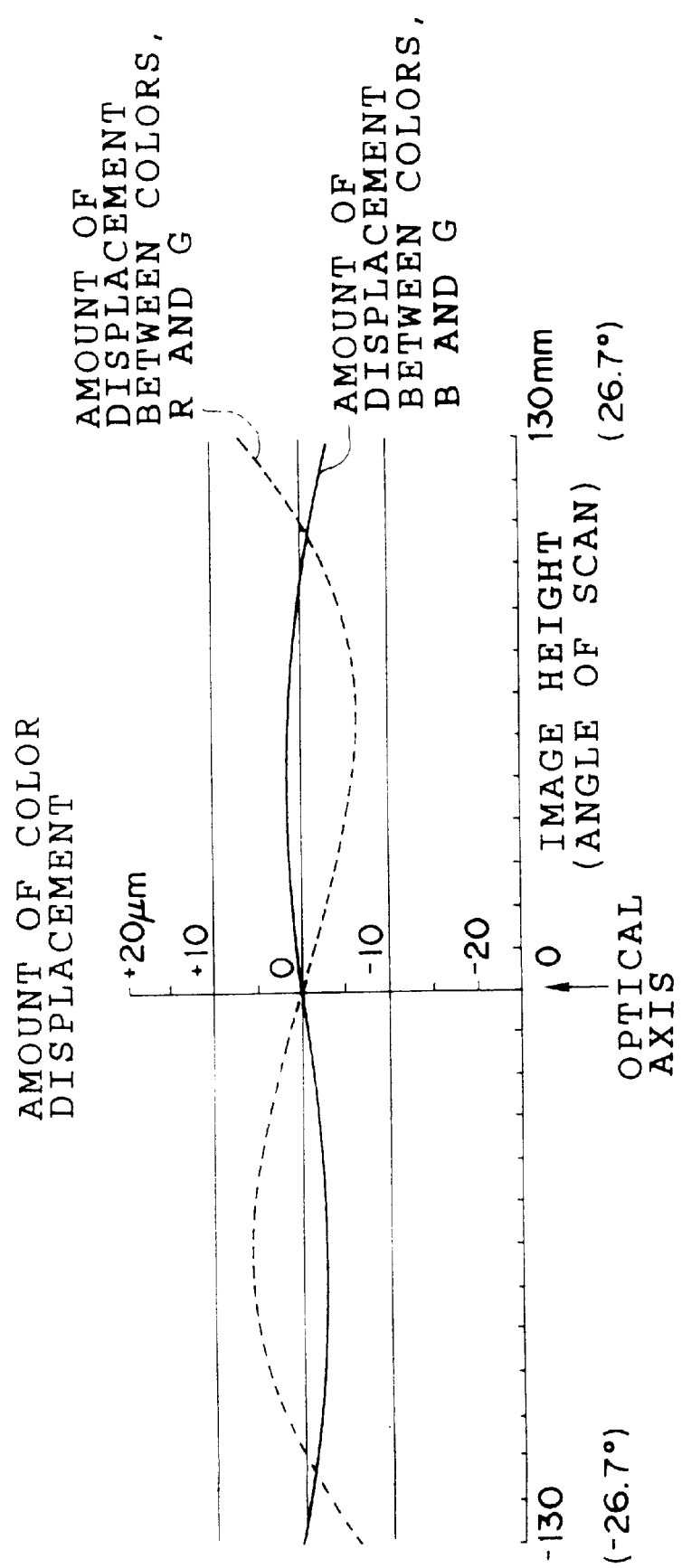
FIG. 10 is a graph which shows amounts of color displacement between R-laser light and G-laser light and between B-laser light and G-laser light when with the frequency of a scanning clock of G-laser light as a reference, the frequency of a scanning clock of R-laser light and B-laser light is set by an expression (1) which will be given later.

In this case, in the laser printer section 18 of this embodiment, when the above-described expression (1) is used to determine the frequency $f_{RB}$, and the respective scanning positions of the laser lights of the three colors are made identical with one another based on the timing at which R-laser light is detected by the SOS detecting sensor 228, as shown in FIG. 10, it is confirmed by a computer simulation that the amount of color displacement between R-laser light and G-laser light and the amount of color displacement between B-laser light and G-laser light can both be made smaller on an average. Therefore, the above-described expression (1) is used. Accordingly, the constant, 0.99973, in the expression (1) is only an example and may vary appropriately in accordance with various conditions of an optical system to be applied, and the like. Meanwhile, the G-oscillator 302 and the RB-oscillator 304 each correspond to the clock generating means of the present invention.

A printer-section driver 242 (see FIG. 8) is connected to the printer-section control circuit 238. Connected to the printer-section driver 242 are a fan 244 and a magazine motor 246. The fan 244 blows air against the exposure section 236 and the magazine motor 246 is used to pull out the photographic printing paper accommodated in a magazine mounted in the laser printer-section. Further, connected to the printer-section control circuit 238 is a back print portion 248 in which characters and the like are printed onto the rear surface of the photographic printing paper 224. Each operation of the fan 244, the magazine motor 246, and the back print portion 248 is controlled by the printer-section control circuit 238.

Further, also connected to the printer-section control circuit 238 are a magazine sensor 250, an operation panel 252 (also seen in FIG. 2), a densitometer 254, and a processor-section control circuit 256 of the process section 20. The magazine sensor 250 detects a mounted/detached state of the magazine in which an unexposed photographic printing paper 224 is accommodated and the size of the photographic printing paper accommodated in the magazine, the operation panel 252 is used by an operator to input various instructions, the densitometer 254 measures the density of an image visualized after the image has been subjected to development and the like in the processor section 20.

Connected to the processor-section control circuit 256 is a miscellaneous sensor 258 which detects passing of the photographic printing paper 224 conveyed on the conveying path within the machine body of the processor section 20 and the liquid-surface position of each of various processing solutions filled in a processing tank, and the like.

Further, connected to the processor-section control circuit 256 are a sorter 260 (also seen in FIG. 2), a replenishing system 262, and an automatic washing system 264. The sorter 260 is used to sort, every predetermined group, photographic printing papers subjected to development processing and the like and discharged from the machine body, the replenishing system 262 is used to replenish the processing tank of the replenishing solution, and the automatic washing system 264 allows washing of rollers and the like. Further, a miscellaneous pump/solenoid 268 is connected via a processor-section driver 266 to the processor-section control circuit 256. Each operation of the sorter 260, the replenishing system 262, the automatic washing system 264, and the miscellaneous pump/solenoid 268 is controlled by the processor-section control circuit 256.

Figure 11:
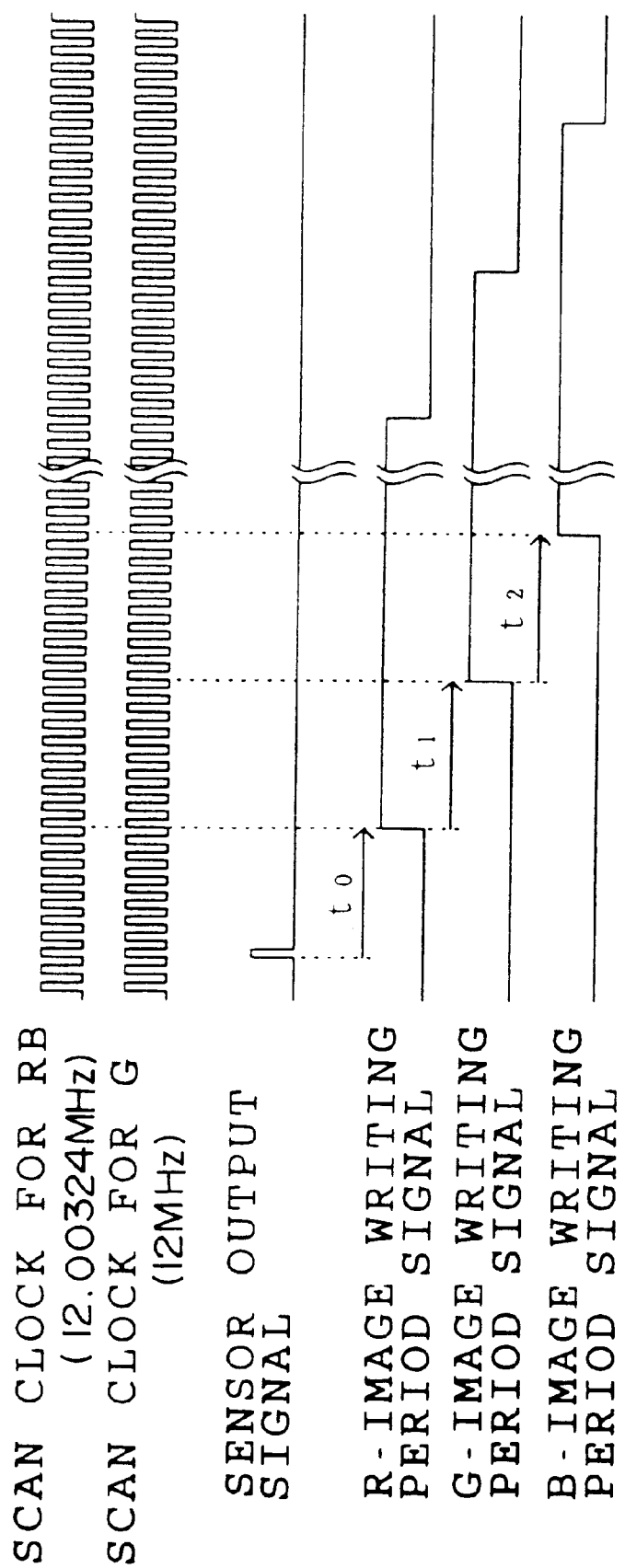
FIG. 11 is a time chart used for illustrating the operation of the printer section control circuit.

Next, a description will be given of the operation of the printer section control circuit 238 when an image is recorded on the photographic printing paper 224 with reference to the time chart shown in FIG. 11. When the power source of the digital laboratory system 10 is turned on, each oscillation of the G-oscillator 302 and the RB-oscillator 304 (also shown in FIG. 9) starts, and as shown in FIG. 11, output of the G-scanning clock to the counter 306 starts and output of the RB-scanning clock to the counters 308 and 310 also starts.

When an image is recorded on the photographic printing paper 224 in the above-described state, based on an image recording parameter inputted from the image processing section 16, the printer section control circuit 238 effects various corrections of the recording image data so as to generate image data for scan and exposure, and stores the same in the frame memory 230. The polygon mirror 218 of the exposure section 236 is rotated in the direction indicated by arrow A in FIG. 6 to allow laser light to be emitted from the laser light sources 210R, 210G, and 210B.

In this state, when R-laser light is detected by the SOS detecting sensor 228 and a sensor output signal rises to a high level, the counter 308 counts the RB-scanning clock, from the start-up time of the sensor output signal (the time when the sensor output signal rises to a high level), until number of pulses reaches the number of pulses corresponding to the time to that the R-laser light takes to arrive at a scan/exposure start position on the photographic printing paper 224 from a position where R-laser light is detected by the SOS detecting sensor 228, setting the time of expiration of counting as the start time of the R-image writing period, and counts the RB-scanning clock, from the start time of the R-image writing period, until number of pulses reaches the number of pulses corresponding to the number of pixels of one line, setting the time of expiration of counting as the finish time of the R-image writing period, and thus generates an R-image writing period signal. In this embodiment, as shown in FIG. 11, the R-image writing period in the R-image writing period signal is set at a high level and other period is set at a low level.

In the printer section control circuit 238, within the period in which the R-image writing period signal generated by the counter 308 is set at a high level, image data for scan and exposure by R is outputted from the frame memory 230 to the AOM driver 213 in the exposure section 236 via the D/A converter 234 synchronously with the RB-scanning clock. As a result, the image data for scan and exposure by R is converted to an analog signal and inputted to the AOM driver 213.

Further, after having counted the G-scanning clock until number of pulses reaches the number of pulses corresponding to the above-described time $t_0$, from the start-up time of the sensor output signal, the counter 306 counts the G-scanning clock until number of pulses reaches the number of pulses corresponding to the time $t_1$ up to the time at which the G-laser light reaches the scan/exposure start position by R-laser light, setting the time of expiration of counting as a start time of the G-image writing period, and further counts the G-scanning clock, from the start time of the G-image writing period, until number of pulses reaches the number of pulses corresponding to the number of pixels of one line, setting the time of expiration of counting as a finish time of the G-image writing period, and thus generates the G-image writing period signal. In this embodiment, as shown in FIG. 11, the G-image writing period in the G-image writing period signal is set at a high level and other period is set at a low level.

In the printer section control circuit 238, within the period in which the G-image writing period signal generated by the counter 306 is set at a high level, image data for scan and exposure by G is outputted from the frame memory 230 to the AOM driver 213 in the exposure section 236 via the D/A converter 234 synchronously with the G-scanning clock. As a result, the image data for scan and exposure by G is converted to an analog signal and inputted to the AOM driver 213.

On the other hand, the counter 310 counts the RB-scanning clock, from the start-up time of the sensor output signal, until number of pulses reaches the number of pulses corresponding to the above-described time to and the number of pulses corresponding to the above-described time $t_1$, and further counts the RB-scanning clock until number of pulses reaches the number of pulses corresponding to the time $t_2$ up to the time at which the B-laser light reaches the scan/exposure start position by G-laser light, thereby setting the time of expiration of counting as the start time of the B-image writing period. The counter 310 further counts the RB-scanning clock, from the start time of the B-image writing period, until number of pulses reaches the number of pulses corresponding to the number of pixels of one line to thereby set the time of expiration of counting as the finish time of the B-image writing period, and thus generates a B-image writing period signal. In this embodiment, as shown in FIG. 11, the B-image writing period in the B-image writing period signal is set at a high level and other period is set at a low level.

In the printer section control circuit 238, within the period in which the B-image writing period signal generated by the counter 310 is set at a high level, image data for scan and exposure by B is outputted from the frame memory 230 to the AOM driver 213 in the exposure section 236 via the D/A converter 234 synchronously with the RB-scanning clock. As a result, the image data for scan and exposure by B is converted to an analog signal and inputted to the AOM driver 213.

As described above, by setting the respective image writing period by the laser light of the colors of R, G, and B, the respective scan/exposure start positions by the laser light of R, G, and B can be made to coincide with one another.

When the scan/exposure image data for each of R, G, and B is inputted to the AOM driver 213 as described above, the AOM driver 213 varies the amplitude of an ultrasonic signal supplied to the AOM 214 in accordance with the level of each of the inputted analog signals and modulates the intensity of the laser light emitted from the AOM 214 as diffracted light in accordance with the level of the analog signal (i.e., any one of the R-density, G-density, and B-density of each pixel of an image to be recorded on the photographic printing paper 224). Accordingly, the laser light of R, G, and B whose intensities are modulated in accordance with the R-density, G-density, and B-density of an image to be recorded on the photographic printing paper 224 are emitted from the three AOMs 214 and are each irradiated onto the photographic printing paper 224 via the plane mirror 215, the spherical lens 216, the cylindrical lens 217, the polygon mirror 218, the fθ lens 220, the cylindrical lens 221, the cylindrical mirror 222, and the return mirror 223.

Each laser light is used to effect main scanning in such a manner that the position onto which each laser light is irradiated is scanned along the direction indicated by arrow B in FIG. 6 while the polygon mirror 218 is rotated in the direction indicated by arrow A in FIG. 6, and sub-scan by laser light is effected in such a manner that the photographic printing paper 224 is conveyed at a constant speed along the direction indicated by arrow C in FIG. 6, and an image is thereby recorded by scan and exposure on the photographic printing paper 224. The photographic printing paper 224 with an image recorded thereon by scan and exposure is conveyed to the processor section 20 and subjected to various processes including color-development, bleach-fixing, washing, and drying. As a result, an image is formed on the photographic printing paper 224.

As described above in detail, in the image exposure apparatus according to this embodiment, an fθ lens 220 is used which is designed so that the characteristic of chromatic aberration of R-laser light and the characteristic of chromatic aberration of B-laser light is substantially the same, so as to allow the scanning wavelength by R-laser light and the scanning wavelength by B-laser light to be made to substantially coincide with each other, and also the frequency of a scanning clock of R-laser light and B-laser light and the frequency of a scanning clock of G-laser light are determined so as to allow the scanning wavelength of R-laser light and B-laser light and the scanning wavelength of G-laser light to be made to substantially coincide with each other, thereby allowing the respective scanning lengths of all the laser lights to be made to substantially coincide with one another in a simple manner. Accordingly, as compared with a case in which the time interval in which a pixel is written for each laser light is adjusted and a case in which an achromatic lens for correcting the chromatic aberration of each laser light of all three colors of R, G, and B is manufactured and used, the occurrence of color displacement can be prevented at a low cost.

In the present embodiment, there was described a case in which the intensity of each laser light was modulated by an AOM, but the present invention is not limited to the same. For example, an electro-optic modulation element (EOM) or a magneto-optic modulation element (MOM) may be used, in place of the AOM, to modulate the intensity of the laser light, or the laser light may be directly modulated.

Further, in the present embodiment, there was described a case in which the timing of the scan and exposure is controlled so that the respective scan/exposure start positions of the laser lights of R, G, and B on the photographic printing paper 224 are made to coincide with one another, but the present invention is not limited to the same. For example, by taking a slight difference in scanning wavelength between the laser light of R, G, and B on the photographic printing paper 224 into consideration to adjust the scan/exposure start position of each laser light, the scan/exposure timing may be controlled so that the central position of an image formed by each laser light is made to coincide exactly. In this case, as compared with the present embodiment, the maximum value of the amount of color displacement can be reduced and an image of higher quality can thereby be obtained.

Moreover, in the present embodiment, there was described a case in which the frequency $f_{RB}$ of the scanning clock generated by the RB-oscillator 304 was set by using the expression (1), but the present invention is not limited to the same. For example, with the frequency $f_{RB}$ being set to be variable using a voltage-controlled oscillator (VCO) or the like and with the amount of color displacement of predetermined image data actually measured, the frequency $f_{RB}$ may be adjusted so that the average amount of color displacement is reduced.

Other Embodiments

Next, other embodiment of the present invention will be described. It should be noted that the structure and operation of sections other than the laser printer section 18 in this embodiment are the same as those of the above-described embodiment, and a description thereof will be omitted.

Figure 12:
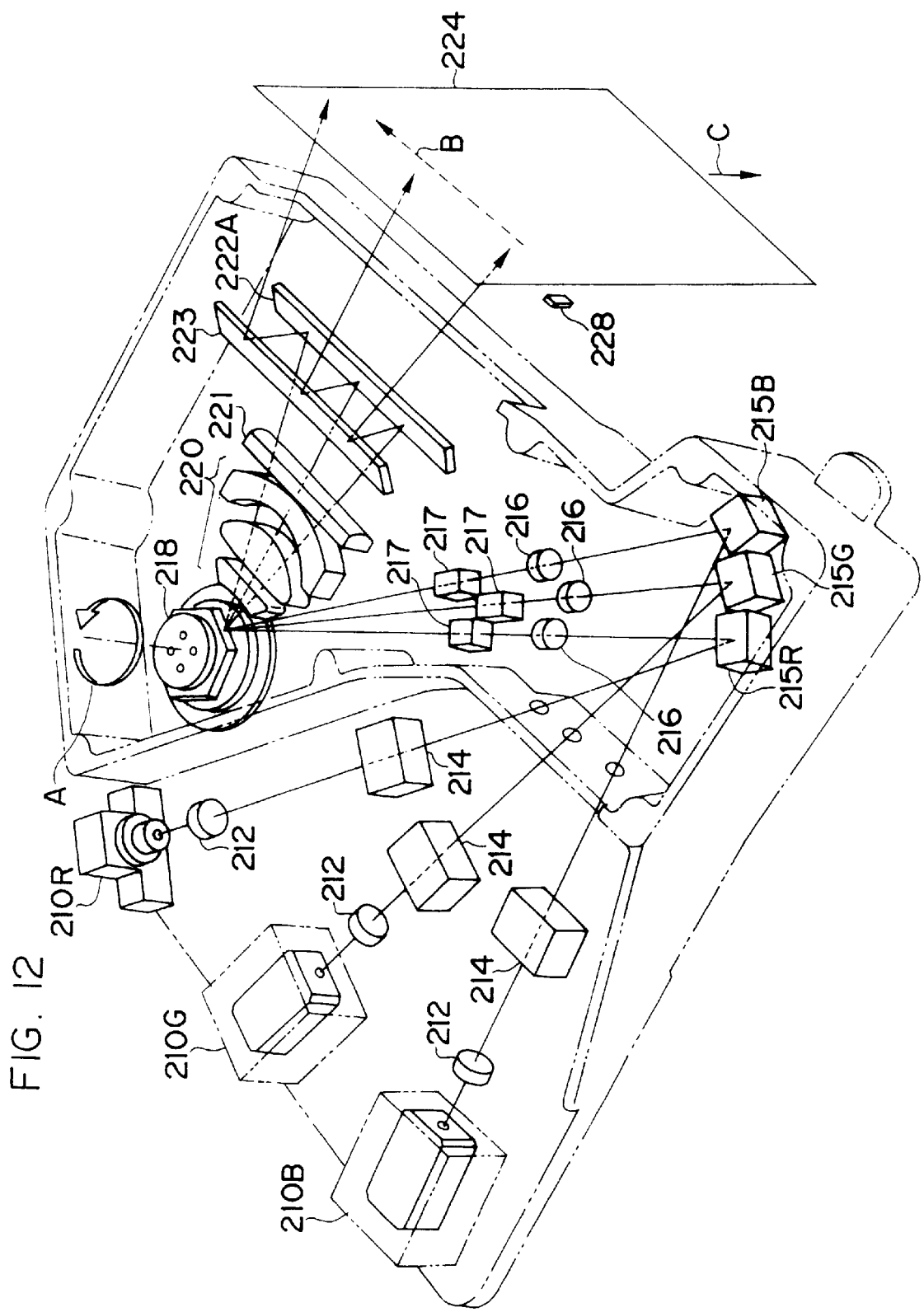
FIG. 12 is a schematic structural diagram of another optical system of the laser printer section.

As shown in FIG. 12, the laser printer section 18 of this embodiment is different from the laser printer section of the above-described embodiment in that mirrors 215R, 215G, and 215B provided to correspond to diffracted light of R, G, and B emitted from the AOMs 214 are provided in place of the plane mirror 215, a plane mirror 222A is provided in place of the cylindrical mirror 222, and laser light reflected by the return mirror 223 is emitted not in a substantially perpendicularly downward direction, but in a substantially horizontal direction.

Accordingly, in the present second embodiment, with the photographic printing paper 224 being positioned so that the scan/exposure surface thereof faces the direction from which laser light is emitted from the return mirror 223, main scanning of laser light is effected in such a manner that the position where each laser light is irradiated is provided along the direction indicated by arrow B in FIG. 12 while the polygon mirror 218 is rotated in the direction indicated by arrow A in FIG. 12, and sub-scanning of laser light is effected in such a manner that the photographic printing paper 224 is conveyed at a constant speed in the direction indicated by arrow C in FIG. 12, and an image is thereby recorded on the photographic printing paper 224 by scan and exposure.

In the image exposure apparatus using a laser printer section 18 having the above-described structure as well, the fθ lens 220 is used which is designed so that each chromatic aberration of R-laser light and B-laser light has substantially the same characteristic, the frequency of a scanning clock of R-laser light and B-laser light and the frequency of a scanning clock of G-laser light are determined so that each scanning wavelength of R-laser light and B-laser light and the scanning wavelength of G-laser light are made to substantially coincide with each other, and the respective scanning lengths of all the laser lights thereby become substantially the same in a simple manner. Accordingly, as compared with a case in which the time interval in which pixels are written for each laser light is adjusted and a case in which an achromatic lens for correcting the chromatic aberration of each laser light of all three colors of R, G, and B is manufactured and used, the occurrence of color displacement can be prevented at a low cost.

What is claimed is:

1. An image exposure apparatus comprising:

at least three kinds of light sources each of which emits a light of a different wavelength;

deflecting means which deflects at least three kinds of emitted light emitted by said light sources in a predetermined scanning direction;

a scanning lens which is disposed so that the at least three kinds of emitted light deflected by said deflecting means can be transmitted therethrough and which allows each chromatic aberration of two kinds of emitted light from among the at least three kinds of emitted light to have substantially the same characteristics;

clock generating means for generating a scanning clock for the two kinds of emitted light and a scanning clock for emitted light other than the two kinds of emitted light, each frequency of the scanning clocks being determined in advance so that the two kinds of emitted light and the emitted light other than the two kinds of emitted light have substantially the same scanning lengths on an exposure surface; and modulating means which modulates the two kinds of emitted light based on image data and the scanning clock for the two kinds of emitted light, and also modulates the emitted light other than the two kinds of emitted light based on image data and the scanning clock for the emitted light other than the two kinds of emitted light.

2. An image exposure apparatus according to claim 1, wherein said modulating means is any one of an acousto-optic modulation element, an electro-optic modulation element, and a magneto-optic modulation element.

3. An image exposure apparatus according to claim 1, wherein the two kinds of emitted light are those whose wavelengths are the farthest from each other among the at least three kinds of emitted light.

4. An image exposure apparatus according to claim 1, wherein the two kinds of emitted light are red and blue and the emitted light other than the two kinds of emitted light is green.

5. An image exposure apparatus according to claim 1, wherein at least one of the frequency of the scanning clock for the two kinds of emitted light and the frequency of the scanning clock for the emitted light other than the two kinds of emitted light can be adjusted based on image data.

6. An image exposure apparatus according to claim 5, wherein the frequency of the scanning clock for the two kinds of emitted light are for red and blue, and can be adjusted based on image data.

7. An image exposure apparatus according to claim 1, further comprising:

emitted light detecting means disposed in the vicinity of an exposure surface and detecting at least one of the at least three kinds of emitted light;

image writing period indicating means which indicates, based on the scanning clock for the two kinds of emitted light and the scanning clock for the emitted light other than the two kinds of emitted light, an image writing period of the at least three kinds of emitted light on the exposure surface; and control means which controls, based on a result of detection by said emitted light detecting means and a result of indication by said image writing period indicating means, writing of an image on an exposure surface so that each of the scan/exposure start positions of the at least three kinds of emitted light on an exposure surface are made to coincide with each other.

8. An image exposure apparatus according to claim 7, wherein emitted light detected by said emitted light detecting means is red.

9. An image exposure apparatus according to claim 7, wherein said modulating means is any one of an acousto-optic modulation element, an electro-optic modulation element, and a magneto-optic modulation element.

10. An image exposure apparatus according to claim 7, wherein the two kinds of emitted light are those whose wavelengths are the farthest from each other among the at least three kinds of emitted light.

11. An image exposure apparatus according to claim 10, wherein the two kinds of emitted light are red and blue and the emitted light other than the two kinds of emitted light is green.

12. An image exposure apparatus according to claim 7, wherein at least one of the frequency of the scanning clock for the two kinds of emitted light and the frequency of the scanning clock for the emitted light other than the two kinds of emitted light can be adjusted based on image data.

13. An image exposure apparatus according to claim 12, wherein the frequency of the scanning clock for the two kinds of emitted light are for red and blue, and can be adjusted based on image data.

* * * * *